United States Patent [19]

Chang et al.

[11] Patent Number: 4,895,600
[45] Date of Patent: Jan. 23, 1990

[54] ASPHALT COMPOSITIONS CONTAINING ANTI-STRIPPING ADDITIVES PREPARED FROM AMINES OR POLYAMINES AND PHOSPHONATES

[75] Inventors: Dane Chang, Houston; Druce K. Crump, Lake Jackson, both of Tex.

[73] Assignee: The Dow Chemical Company, Midland, Mich.

[21] Appl. No.: 225,322

[22] Filed: Jul. 28, 1988

Related U.S. Application Data

[63] Continuation of Ser. No. 94,982, Sep. 9, 1987, Pat. No. 4,786,329.

[51] Int. Cl.[4] .............................................. C08L 95/00
[52] U.S. Cl. .............................. 106/284.1; 106/284.4; 106/277; 208/44
[58] Field of Search ................ 106/284.1, 284.4, 277; 208/44

[56] References Cited

U.S. PATENT DOCUMENTS

| | | | |
|---|---|---|---|
| 3,518,101 | 6/1970 | Gzemski et al. | 106/277 |
| 3,861,933 | 1/1975 | Doi | 106/284.4 |
| 4,462,840 | 7/1984 | Schilling et al. | 106/277 |
| 4,478,642 | 10/1984 | Schilling et al. | 106/277 |
| 4,494,992 | 1/1985 | Schilling et al. | 106/277 |
| 4,547,224 | 10/1985 | Schilling | 106/277 |
| 4,561,901 | 12/1985 | Schilling | 106/284.4 |
| 4,724,003 | 2/1988 | Treybig et al. | 106/284.4 |
| 4,786,329 | 11/1988 | Chang et al. | 106/284.1 |

*Primary Examiner*—Paul Lieberman
*Assistant Examiner*—Helene Kelmanski

[57] ABSTRACT

Asphalt compositions are improved by incorporating therein the reaction produce of (a) a phosphorus-containing compound, (b) an amine or polyamine and (c) a carbonyl-containing compound as an anti-stripping agent. These asphalt compositions are useful as a pavement material by blending with an aggregate.

9 Claims, No Drawings

ASPHALT COMPOSITIONS CONTAINING ANTI-STRIPPING ADDITIVES PREPARED FROM AMINES OR POLYAMINES AND PHOSPHONATES

CROSS-REFERENCE TO RELATED APPLICATION

This is a continuation of application Ser. No. 094,982, filed Sept. 9, 1987 now U.S. Pat. No. 4,786,329 which is incorporated herein in its entirety by reference.

FIELD OF THE INVENTION

The present invention concerns anti-stripping additives for asphalt compositions.

BACKGROUND OF THE INVENTION

The use of petroleum residuum such as asphalt as a paving material and other construction material is well known. It is also well known that it is desirable to include in such compositions anti-stripping additives so as to reduce the tendency of the paving material which consists of the asphalt and an aggregate material from deteriorating during inclement weather conditions. During the winter months, the low temperatures tend to stiffen and reduce the flexibility of the asphalt binder in the paving material. Traffic loadings then cause the pavement to crack. When that happens, surface water can easily seep into the pavement. As the water goes through freeze-thaw cycles, it strips the asphalt from the aggregate surfaces, reduces the pavement's strength and accelerates deterioration. During the summer months, high temperatures can cause the asphalt pavement to become so soft that traffic can permanently deform the material and create shoving, rutting, bleeding and flushing problems. The incorporation of an anti-stripping additive into the asphalt composition employed in preparing the pavement increases the life of the pavement. It would be desirable to have anti-stripping additives for asphalt which improves its adhesion to the aggregate material.

SUMMARY OF THE INVENTION

The present invention pertains to a composition which comprises a blend of
(A) bituminous material and
(B) the product resulting from reacting at conditions sufficient to complete the reaction of
(1) at least one phosphorus-containing compound represented by the formula

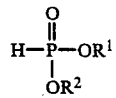

wherein $R^1$ and $R^2$ are independently hydrogen or a monovalent hydrocarbyl group having from 1 to about 20 carbon atoms;
(2) at least one material selected from
(a) at least one organic amine;
(b) at least one organic polyamine;
(c) at least one hydrohalide salt of an organic amine;
(d) at least one hydrohalide salt of an organic polyamine; or
(e) a combination of any two or more of (a), (b), (c) or (d); and
(3) at least one carbonyl-containing compound which will react with the phosphorus-containing compound;
wherein components (1), (2) and (3) are employed in quantities which provide a ratio of carbonyl groups:phosphorus atoms :amine hydrogen atoms of from about 0.1:0.1:1 to about 2:1.5:1; and
wherein components (A) and (B) are employed in quantities which provide from about 0.05 to about 10 percent by weight of component (B) based upon the weight of component (A).

The present invention provides anti-stripping additives for asphalt which improves its adhesion to the aggregate material.

DETAILED DESCRIPTION OF THE INVENTION

The bituminous material employed herein in the practice of the present invention is not critical. Any bitumen, asphalt or crude residuum containing alphaltenes can be employed. U.S. Pat. No. 3,317,447 contains a good description of useful bituminous materials which are useful herein and is incorporated herein by reference. In general, the asphalts which can be employed include conventional petroleum asphalts, natural asphalts, gilsonite, air blown asphalts, coal tar and other similar materials. The asphalts are characterized by having penetration grades up to 300 as measured by ASTM Method D5. Preferred asphalts are the normal paving asphalts (e.g. AC5, AC10, AC20, and AC30. AC indicates asphalt cement and the number indicates the viscosity at 140° F. in poise divided by 100).

The anti-stripping agent, component (B) is employed in amounts which provide from about 0.05 to about 10, suitably from about 0.25 to about 5, more suitably from about 0.5 to about 2.5, most suitably from about 0.5 to about 1, percent by weight of anti-stripping agent based upon the weight of the bituminous material, component (A).

A particularly suitable method for preparing the anti-stripping agents employed herein is described by Irani and Moedritzer in U.S. Pat. No. 3,288,846 which is incorporated herein by reference.

In preparing the anti-stripping agents employed in the present invention, the components from which the anti-stripping agent is prepared are employed in quantities which provide a ratio of carbonyl groups: phosphorus atoms:amine hydrogen atoms suitably from about 0.1:0.1:1 to about 2:1.5:1, more suitably from about 0.4:0.4:1 to about 1.5:1.2:1, most suitably from about 0.75:0.75:1 to about 1.5:1.2:1.

The reaction for producing the anti-stripping agent employed herein is usually conducted in the presence of a solvent. The solvent serves as a reaction, polymerization or oligomerization diluent. The solvent of choice is generally water, but the solubility of the phosphorus-containing compound, the carbonyl-containing compound, the amine or polyamine and the solubility of the resulting product or oligomers often require the use of other solvents. Advantageously, the solvent is one in which both the reactants and resultant product or oligomers are soluble. Other suitable solvents include, for example, alcohols, cyclic ethers, amides, aromatic and aliphatic hydrocarbons and the like. Particularly suitable nonaqueous solvents include, for example, methanol, ethanol, isopropanol, butanol, benzene, dioxane, dimethylformamide, tetrahydrofuran, combinations thereof and the like. The solvent can be removed from the reaction product by distillation.

Suitable phosphorus-containing compounds which can be employed herein include, those represented by the following formula I

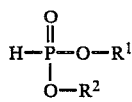

FORMULA I wherein each $R^1$ and $R^2$ are independently hydrogen or a monovalent hydrocarbyl group having from 1 to about 20, suitably from about 1 to about 15, more suitably from about 1 to about 10, carbon atoms.

The term hydrocarbyl as employed herein includes, alkyl, cycloalkyl, aryl, aralkyl, alkaryl, alkenyl and the like.

Examples of particularly suitable phosphorus-containing compounds which can be employed herein include, for example, phosphorous acid and its aliphatic and aromatic esters such as, for example, orthophosphorous acid, dimethylphosphite, diethylphosphite, bis(2-butoxyethyl)phosphite, dibutylphosphite, diphenylphosphite, other alcohol esters of phosphorous acid and mixed alcohol esters of phosphorous acid, combinations thereof and the like.

Suitable carbonyl-containing compounds which can be employed herein include, for example, aldehydes and ketones and combinations thereof. The aldehydes and ketones can be either aliphatic, cycloaliphatic, or aromatic. The aliphatic aldehydes and ketones can be either saturated or unsaturated and can be substituted with substituents such as halogens, carboxyl groups, hydroxyl groups, alkoxy groups, and the like.

Suitable aldehydes include, for example, those containing suitably from 1 to about 20, more suitably from 1 to about 10, most suitably from 1 to about 7, carbon atoms. Particularly suitable aldehydes include, for example, formaldehyde, acetaldehyde, glyoxylic acid, benzaldehyde, crotonaldehyde, 2-bromoacetaldehyde, glutaraldehyde, malonaldehyde, aminobenzaldehyde, combinations thereof and the like.

Suitable ketones include, for example, those containing suitably from 1 to about 20, more suitably from 1 to about 10, most suitably from 1 to about 7, carbon atoms. Particularly suitable ketones include, for example, acetone, methyl ethyl ketone, 2-pentanone, 3-pentanone, 1-chloro-2-propanone, acetophenone, 2,4-pentanedione, 1-phenyl-2-propanone, m-chlorobenzaldehyde, combinations thereof and the like.

Suitable organic amines which can be employed herein include those disclosed in U.S. Pat. Nos. 3,459,710 and 4,292,413 which are incorporated herein by reference. Other organic amines include, for example triethylenetetramine, tetraethylenepentamine, pentaethylenehexamine, hexaethyleneheptamine, polyoxypropyleneamine, 2-(2-aminoethylamino)ethanol, N-decyl-1,2-ethanediamine, N-undecyl-1,2-ethanediamine, N-tridecyl-1,2-ethanediamine, N-pentadecyl-1,2-ethanediamine, N-hexadecyl-1,2-ethanediamine, N-heptadecyl-1,2-ethanediamine, N-octadecyl-1,2-ethanediamine, N-decyl-1,3-propanediamine, N-dodecyl-1,3-propanediamine, N-tetradecyl-1,3-propanediamine, N-hexadecyl-1,3-propane-diamine, N-heptadecyl-1,3-propanediamine, N-octadecyl-1,2-propanediamine, N-octadecyl-1,3-propanediamine, octadecen-1,3-propanediamine, 1-heptanamine, 1-octanamine, 1-nonamine, 1-decanamine, 1-undecanamine, 1-dodecanamine, 1-tridecanamine, 1-tetradecanamine, 1-pentadecanamine, 1-hexadecanamine, 1-heptadecanamine, 1-octadecanamine, octadecen-1-amine, N-methylhexanamine, N-methylheptanamine, N-methyl-1-decanamine, N-(1-methylethyl)-1-pentanamine, N-(1-methylethyl)-1-decanamine, N-methyl-1-octadecanamine, N-dodecyl-1-dodecanamine, and the like as well as mixtures thereof.

Particularly suitable organic polyamines which can be employed herein include, for example, those represented by the formulas II, III OR IV

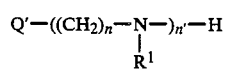  FORMULA II

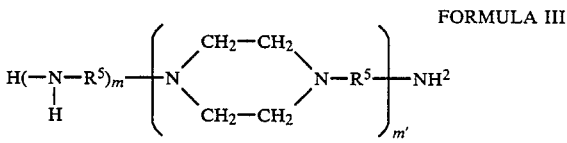  FORMULA III

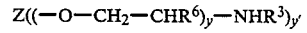  FORMULA IV wherein Q' is $HR^3N-$ or $(CH_3O)_3Si-$; each $R^3$ and $R^4$ is independently hydrogen or a hydrocarbyl group or hydroxyl substituted hydrocarbyl group or amine substituted hydrocarbyl group having from about 1 to about 36, suitably from about 1 to about 20, more suitably from about 1 to about 10, most suitably from about 1 to about 3, carbon atoms; each $R^5$ is independently a divalent hydrocarbyl group having from 1 to about 36, suitably from about 1 to about 20, more suitably from about 1 to about 10, most suitably from about 1 to about 3, carbon atoms; each $R^6$ is independently hydrogen or an alkyl or haloalkyl group having from 1 to about 4 carbon atoms; Z is a polyvalent hydrocarbyl group having from 2 to about 8, suitably from 2 to about 5 carbon atoms; m has a value from zero to about 8; m' has a value from 1 to about 4; n has a value of 2 or 3; n' has a value from 1 to about 10; y has a value from 1 to about 30, suitably from 1 to about 20, most suitably from 1 to about 10; and y' has a value from about 2 to about 8, preferably from about 2 to about 3. The term hydrocarbyl as employed herein includes, alkyl, cycloalkyl, aryl, aralkyl, alkaryl, alkenyl and the like.

The amines or polyamines can be partially alkoxylated such as partially ethoxylated, partially propoxylated, partially butoxylated or partially polyethoxylated, partially polypropoxylated or partially polybutoxylated, provided that there remains at least one amine hydrogen atom per molecule. Also suitable are the aminated polyols. Suitable such aminated polyols include, for example aminated ethylene glycol, aminated polyoxyethylene glycol, aminated propylene glycol, aminated polyoxypropylene glycol, aminated glycerine, aminated reaction products of ammonia or an amine such as methylamine, ethylamine, propylamine, butylamine, ethylenediamine, propylenediamine, diethylenetriamine or the like with an alkylene oxide such as ethylene oxide, propylene oxide, butylene oxide, mixtures thereof and the like, aminated reaction products of trimethylol propane with an alkylene oxide such as ethylene oxide, propylene oxide, butylene oxide, mixtures thereof and the like. Suitable such aminated polyols include, those disclosed in U.S. Pat. No. 4,374,222.

The amine or polyamine can be neutralized with a hydrohalide. Particularly suitable hydrohalides include, for example, hydrochlorides, hydrobromides, hydroiodides, combinations thereof and the like.

The products resulting from reacting the carbonyl-containing compound, phosphorus-containing compound and organic amine are believed to be those compounds represented by the following formulas V, VI or VII

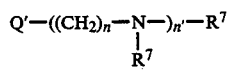   FORMULA V

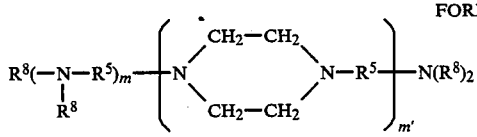   FORMULA VI

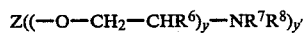   FORMULA VII wherein $Q'$ is $(R^7)_2N-$, or $(CH_3O)_3Si-$; each $R^5$ is independently a divalent hydrocarbyl group having from 1 to about 36, suitably from about 1 to about 20, more suitably from about 1 to about 10, most suitably from about 1 to about 3, carbon atoms; each $R^6$ is independently hydrogen or an alkyl or haloalkyl group having from 1 to about 4 carbon atoms; each $R^7$ is independently hydrogen, the group represented by the following formula VIII

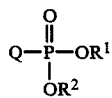   FORMULA VIII wherein $R^1$ and $R^2$ are as previously defined and Q is a divalent hydrocarbyl group having from 1 to about 20, suitably from 1 to about 10, more suitably from 1 to about 7, most suitably from 1 to about 4, carbon atoms, or a hydrocarbyl group or hydroxyl or amine substituted hydrocarbyl group having from about 1 to about 36, suitably from about 1 to about 20, more suitably from about 1 to about 10, most suitably from about 1 to about 3, carbon atoms; each $R^8$ is independently hydrogen or the group represented by formula VIII; Z is a polyvalent hydrocarbyl group having from 2 to about 8, suitably from 2 to about 5 carbon atoms; m has a value from zero to about 8; m' has a value from 1 to about 4; n has a value of 2 or 3; n' has a value from 1 to about 30; y has a value from 1 to about 20, suitably from about 1 to about 15, most suitably from about 1 to about 10; and y' has a value from about 2 to about 8, preferably from about 2 to about 3; with the proviso that at least about 10, suitably from about 25 to about 100, more suitably from about 50 to about 100, most suitably from about 75 to about 100 percent of the $R^7$ and $R^8$ groups are the group represented by formula VIII.

The asphalt compositions of the present invention can be blended with any of the aggregate materials known to the art in order to form pavement compositions.

The following examples are illustrative of the invention, but are not intended to limit the scope thereof in any manner.

EXAMPLE 1

(Phosphonate of Diethylenetriamine)

To a 1 liter 5-neck flask fitted with a reflux condenser and dropping funnel is added 586 grams (5 moles) 70% phosphorous acid ($H_3PO_3$). 104 grams (1 mole), diethylenetriamine is then added dropwise while stirring, followed by 110 grams (3 moles) anhydrous HCl added via BAS addition tube. The mixture is then heated to reflux and 300 grams (5 moles) 50% aqueous formaldehyde is added dropwise while stirring at reflux over a 2 hour period. Reflux is continued for 2 hours after the $CH_2O$ addition is complete. The reaction mixture is then cooled and bottled and contains approximately 48% by weight of diethylenetriamine penta(methylene phosphonic acid).

EXAMPLE 2

(Silicon Amino Phosphonate I)

To a 250 ml three neck flask fitted with a reflux condenser and dropping funnel is added deionized water, 70% phosphorous acid (0.038 mole), 37% aqueous formaldehyde (0.075 mole), HCl (2.5 grams), and $H_2SO_4$ (2.5 grams). This is stirred vigorously and heated to reflux. Then, 5.6 grams (0.025 moles) of N-2-aminoethyl-3-aminopropyltrimethoxysilane is added dropwise. The mixture is heated and stirred overnight. After the reaction cooled, a sample is neutralized with 50% sodium hydroxide.

EXAMPLE 3

(Silicon Amino Phosphonate II)

To a 500 ml three neck flask fitted with a reflux condenser and dropping funnel is added 55.6 g (0.25 mole)-(of N-2-aminoethyl-3-aminopropyltrimethoxysilane. To this is added slowly a mixture of 70% phosphorous acid (0.5 mole), deionized water, and concentrated hydrochloric acid (60 grams). The mixture is heated to gentle reflux and 37% aqueous formaldehyde (0.50 mole) is added dropwise during one hour. The mixture is heated for an additional hour to complete the reaction.

EXAMPLE 4

(Aminoethyl Ethanolamine Phosphonate)

To a 500 ml three neck flask fitted with a reflux condenser and dropping funnel is added 131.2 grams (1.12 moles) 70% phosphorous acid and 207.2 grams (2.1 moles) 37% hydrochloric acid. Aminoethyl ethanolamine, 42.1 grams (0.40 mole) is then added dropwise while stirring. The mixture is then heated to reflux and 97.3 grams (1.2 moles) 37% aqueous formaldehyde is added dropwise during 1 hour. Reflux is continued for 2 hours after completion of the formaldehyde addition. The mixture is then cooled and bottled.

EXAMPLE 5

(Triethylenetetramine Phosphonate)

To a 1 liter 5 neck flask fitted with a reflux condenser and dropping funnel is added 234.3 grams (2 mole) 70% phosphorous acid. Triethylenetetramine, 146 grams (1 mole) is then added dropwise while stirring, followed by 146 grams (4 moles) anhydrous HCl. The mixture is then heated to reflux and 162.2 grams (2 moles) 37% aqueous formaldehyde is added dropwise over 1 hour. Reflux is maintained for 2 hours after formaldehyde addition is complete, after which the reaction mixture containing the amino methylene phosphonic acid product is cooled and bottled.

EXAMPLE 6

(Bis(aminoethyl Piperazine)Urea) Phosphonate

To a 500 ml three neck flask is added 75.00 grams (0.264 moles) of the product resulting from condensing 2 moles of aminoethylpiperazine with 1 mole of urea (bis-aep/urea), 50 grams deionized water, 36.5 grams (1 mole) anhydrous HCl, and 65.7 grams (0.561 moles) 70% phosphorous acid. The mixture is heated to reflux and 45.48 grams (0.561 moles) 37% formaldehyde is added dropwise during 1 hour. Reflux is continued for 2 hours after formaldehyde addition is complete. The mixture containing the phosphonomethylated amine product is then cooled and bottled.

EXAMPLE 7

The anti-stripping additives or agents prepared in examples 1-6 are mixed with asphalt and the resultant blend is then mixed with an aggregate and subjected to a boil test and a freeze-thaw test. A description of the tests are as follows and the results are given in the Table. In these tests, AC-20 type asphalt obtained from Texas Cosden Oil & Chemical Co. is employed. Five siliceous aggregates which have shown signs of serious stripping problems are tested. The names and the origins and silicon contents of these aggregates are:

Davidson (Ga., 81% Si)
Gifford-Hill (Bryan, Tex., 100% Si)
Waco (Waco, Tex., 98% Si)
Granite (Calif., 61% Si)
Helms (Nev., 63% Si)

BOIL TEST

Preparation of Mixtures

In order to minimize the effect of aggregate interlock while maximizing the bond between the aggregate and the asphalt cement, each individual aggregate is first wet sieved to obtain the portion that passes No. 8 sieve and retained on No. 20 sieve (U.S. standard testing sieve series, ASTM E-11). Then 100 g of this size dry aggregate is heated to 160° C. plus or minus 3° C. for at least 2 hours. The asphalt cement (6 g) with 60 mg of anti-stripping additive is heated and stirred at 160° C. for 5 minutes. At the appropriate time, the hot dry aggregate is poured into the asphalt and mixed manually on a hot plate as rapidly and thoroughly as possible for 5 minutes. This mixture is then allowed to cool at room temperature for at least 2 hours before testing.

Test Procedure

A 1-liter beaker is filled with 500 ml deionized water and heated to boiling. The prepared aggregate-asphalt mixture is added to the boiling water which temporarily lowers the temperature below the boiling point. The heat is then increased so that the water reboiled in approximately 2 to 3 minutes. The water is maintained at the boiling temperature for 10 minutes while stirring with a glass rod at 3-minute intervals. During and after boiling, the stripped asphalt is skimmed away from the water surface with a paper towel to prevent recoating the aggregate. The mixture is then poured onto a paper towel and allowed to dry. The amount of asphalt retained on the mixture is determined by visual rating expressed in terms of percent of retained asphalt. To standardize this evaluation, a set of 10 sample mixtures representing a scale of from 0 to 100 percent asphalt retention is prepared. By referring to these standard mixtures, the percent of asphalt retained on the aggregate is determined. An additive is considered to pass the boil test when an aggregate retains more than 70% of the original quantity of the mixture of additive and asphalt previously coated onto the aggregate.

FREEZE-THAW TEST

Preparation of Mixtures

In order to minimize the effect of aggregate interlock while maximizing the bond between the aggregate and the asphalt cement, each individual aggregate is first wet sieved to obtain the portion that passes No. 20 sieve and retained on No. 35 sieve (U.S. standard testing sieve series, ASTM E-11). Then 46 g of this aggregate is heated at 160° C. plus or minus 3° C. for at least 2 hours. Three grams of asphalt cement containing 1% by weight of the anti-stripping additive is mixed at 160° C. for 5 minutes. At the appropriate time, the hot aggregate is added to the asphalt and manually mixed as thoroughly and rapidly as possible for 5 minutes. This mixture is then allowed to cool at room temperature for over 30 minutes before compaction of the specimen is begun. The specimen is then compacted by reheating the asphalt concrete mixture at 150° C. for 20 minutes, then transferring the mixture to a steel molding cylinder with a 41.33 mm inside diameter and compacting by applying a constant load of 6200 lbs. (2812.32 kg) which corresponds to a force of 27.6 kN for 7 minutes. Generally, 46 g of each individual aggregate will produce a compacted briquet with a uniform height of 19.05 mm, plus or minus 0.127 mm. After compaction, the briquet is extracted from the mold and allowed to cool and cure at room temperature for two days before freeze-thaw cycling.

Test Procedure

The briquet is placed on a cone shaped stress pedestal with only the center of the briquet bottom touching the pedestal. This entire assembly is then placed in a jar with enough distilled water to fill the jar to about one-half inch (12.7 mm) above the test briquet. The jar is then placed in a freezer at a temperature of $-12°$ C. for 15 hours. After this period, the jar is then transferred to a 50° C. oven for 9 hours. At the end of each complete freeze-thaw cycle, the briquet is carefully examined for the appearance of surface cracks. If no cracks are visible, the briquet is subjected to subsequent freeze-thaw cycles until cracks are observed or the test terminated. An additive is considered to pass the freeze-thaw test when the briquet with additive passes more freeze-thaw cycles than the briquet with no additive. A particularly useful additive is one whose briquet passes twenty-five or more freeze-thaw cycles.

TABLE

| RUN NO. | ADDITIVE TYPE | AGGREGATE TYPE | BOIL TEST[1] | FREEZE-THAW TEST[2] |
| --- | --- | --- | --- | --- |
| A* | None | Davidson | 5 | 6 |
| B | Ex. 1 | Davidson | 20 | 6 |
| C | Ex. 2 | Davidson | 5 | 8 |
| D | Ex. 3 | Davidson | 20 | 26 |
| E | Ex. 4 | Davidson | 20 | 11 |
| F | Ex. 5 | Davidson | 5 | 11 |
| G | Ex. 6 | Davidson | 5 | 10 |
| H* | None | Gifford-Hill | 40 | 6 |
| I | Ex. 1 | Gifford-Hill | 90 | 11 |
| J | Ex. 2 | Gifford-Hill | 50 | 11 |
| K | Ex. 3 | Gifford-Hill | 60 | 10 |

TABLE-continued

| RUN NO. | ADDITIVE TYPE | AGGREGATE TYPE | BOIL TEST[1] | FREEZE-THAW TEST[2] |
|---|---|---|---|---|
| L | Ex. 4 | Gifford-Hill | 95 | 7 |
| M | Ex. 5 | Gifford-Hill | 100 | 33 |
| N | Ex. 6 | Gifford-Hill | 95 | 7 |
| O* | None | Waco | 5 | 4 |
| P | Ex. 1 | Waco | 50 | 31 |
| Q | Ex. 2 | Waco | 35 | 6 |
| R | Ex. 3 | Waco | 50 | 8 |
| S | Ex. 4 | Waco | 50 | 17 |
| T | Ex. 5 | Waco | 30 | 8 |
| U | Ex. 6 | Waco | 20 | 7 |
| V* | None | Granite | 90 | 13 |
| W | Ex. 1 | Granite | 100 | 14 |
| X | Ex. 2 | Granite | 95 | >40 |
| Y | Ex. 3 | Granite | 95 | >40 |
| Z | Ex. 4 | Granite | 100 | 15 |
| AA | Ex. 5 | Granite | 100 | 37 |
| AB | Ex. 6 | Granite | 100 | >40 |
| AC* | None | Helms | 80 | 9 |
| AD | Ex. 1 | Helms | 100 | 25 |
| AE | Ex. 2 | Helms | 90 | 22 |
| AD | Ex. 3 | Helms | 90 | 25 |
| AE | Ex. 4 | Helms | 95 | 20 |
| AF | Ex. 5 | Helms | 100 | 24 |
| AG | Ex. 6 | Helms | 100 | 20 |

*Not an example of the present invention.
[1]Percentage of asphalt remaining on the aggregate after boiling.
[2]The number of freeze-thaw cycles the asphalt concrete withstands before cracking.

Additives that pass the boil and freeze-thaw tests are considered to be useful anti-stripping additives for asphalt. The results in the above table clearly show that the reaction product of an amine with a phosphonate are particularly useful anti-stripping additives for asphalt with either Davidson, Gifford-Hill, Waco, Granite or Helms type aggregates.

What is claimed is:

1. A composition which comprises a blend comprising:
   (A) bituminous material and
   (B) the product resulting from reacting at conditions sufficient to complete the reaction of
      (1) phosphorous acid;
      (2) at least one organic polyamine represented by the following formula IV

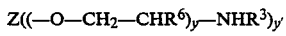
$$Z((-O-CH_2-CHR^6)_y-NHR^3)_{y'} \quad \text{FORMULA IV}$$

wherein each $R^3$ is independently hydrogen or a hydrocarbyl group or hydroxyl substituted hydrocarbyl group or amine substituted hydrocarbyl group having from about 1 to about 36, carbon atoms; each $R^6$ is independently hydrogen or an alkyl or haloalkyl group having from 1 to about 4 carbon atoms; Z is a polyvalent hydrocarbyl group having from 2 to about 8 carbon atoms; y has a value from 1 to about 20; and y' has a value from about 2 to about 8; and
      (3) at least one carbonyl-containing compound which will react with the phosphorus-containing compound;
wherein components (1), (2) and (3) are employed in quantities which provide a ratio of carbonyl groups:phosphorus atoms:amine hydrogen atoms of from about 0.1:0.1:1 to about 2:1.5:1; and wherein components (A) and (B) are employed in quantities which provide from about 0.05 to about 10 percent by weight of component (B) based upon the weight of component (A).

2. A composition of claim 1 wherein
   (a) components (B-1), (B-2) and (B-3) are employed in quantities which provide a ratio of carbonyl groups:phosphorus atoms:amine hydrogen atoms of from about 0.4:0.4:1 to about 1.5:1.2:1; and
   (b) components (A) and (B) are employed in quantities which provide from about 0.25 to about 5 percent by weight of component (B) based upon the weight of component (A).

3. A composition of claim 1 wherein
   (a) components (B-1), (B-2) and (B-3) are employed in quantities which provide a ratio of carbonyl groups:phosphorus atoms:amine hydrogen atoms of from about 0.75:0.75:1 to about 1.5:1.2:1; and
   (b) components (A) and (B) are employed in quantities which provide from about 0.5 to about 2.5 percent by weight of component (B) based upon the weight of component (A).

4. A composition of claim 3 wherein components (A) and (B) are employed in quantities which provide from about 0.5 to about 1 percent by weight of component (B) based upon the weight of component (A).

5. A composition of claim 1, 2, 3 or 4 wherein
   (a) component (A) is asphalt; and
   (b) component (B-3) is an aldehyde or ketone.

6. A composition of claim 5 wherein in component (B-2), each $R^3$ is independently hydrogen or a monovalent hydrocarbyl group or hydroxyl or amine substituted hydrocarbyl group having from about 1 to about 20 carbon atoms, each $R^6$ is independently hydrogen or an alkyl or haloalkyl group having from 1 to about 4 carbon atoms, Z is a polyvalent hydrocarbyl group having from 2 to about 8 carbon atoms, y has a value from 1 to about 10; and y' has a value from about 2 to about 3.

7. A composition of claim 6 wherein in component (B-2), each $R^3$ is independently hydrogen or a monovalent hydrocarbyl group or hydroxyl or amine substituted monovalent hydrocarbyl group having from about 1 to about 10 carbon atoms; each $R^6$ is independently hydrogen or an alkyl or haloalkyl group having from 1 to about 4 carbon atoms; Z is a polyvalent hydrocarbyl group having from 2 to about 3 carbon atoms; and y has a value from 2 to about 8.

8. A composition of claim 6 wherein in component (B-2), each $R^3$ is independently hydrogen or a monovalent hydrocarbyl group or hydroxyl or amine substituted monovalent hydrocarbyl group having from about 1 to about 3, carbon atoms; and each $R^6$ is independently hydrogen or an alkyl or haloalkyl group having from 1 to about 4 carbon atoms.

9. A composition of claim 1, 2, 3 or 4 wherein
   (a) component (B-3) is formaldehyde, acetone, acetaldehyde, glyoxylic acid, benzaldehyde, crotonaldehyde, 2-bromoacetaldehyde, glutaraldehyde, malonaldehyde, methyl ethyl ketone, aminobenzaldehyde, acetophenone, 2-pentanone, 3-pentanone, 2,4-pentanedione, or a combination thereof.

* * * * *